(12) United States Patent
Ogushi et al.

(10) Patent No.: US 9,939,919 B2
(45) Date of Patent: Apr. 10, 2018

(54) INPUT DEVICE AND ELECTRONIC APPARATUS INCLUDING SAME

(71) Applicant: Sharp Kabushiki Kaisha, Osaka-shi, Osaka (JP)

(72) Inventors: Shinichi Ogushi, Osaka (JP); Takashi Sawada, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 118 days.

(21) Appl. No.: 15/026,105

(22) PCT Filed: Jan. 21, 2015

(86) PCT No.: PCT/JP2015/051548
§ 371 (c)(1),
(2) Date: Mar. 30, 2016

(87) PCT Pub. No.: WO2015/111624
PCT Pub. Date: Jul. 30, 2015

(65) Prior Publication Data
US 2016/0246386 A1    Aug. 25, 2016

(30) Foreign Application Priority Data

Jan. 22, 2014    (JP) ................... 2014-009700

(51) Int. Cl.
*G06F 3/02*    (2006.01)
*H01H 13/705*    (2006.01)

(52) U.S. Cl.
CPC .............. *G06F 3/0202* (2013.01); *G06F 3/02* (2013.01); *H01H 13/705* (2013.01); *H01H 2221/044* (2013.01); *H01H 2221/054* (2013.01); *H01H 2223/0345* (2013.01); *H01H 2233/004* (2013.01); *H01H 2233/03* (2013.01)

(58) Field of Classification Search
CPC ....... G06F 3/0202; G06F 3/02; H01H 13/705; H01H 2233/03; H01H 2223/0345; H01H 2221/054; H01H 2221/044; H01H 2233/004
See application file for complete search history.

(56) References Cited

U.S. PATENT DOCUMENTS

2006/0157326 A1*    7/2006    Hsu ................. H01H 3/125
                                              200/5 A
2011/0114461 A1*    5/2011    Chen ............... H01H 13/705
                                              200/344

FOREIGN PATENT DOCUMENTS

JP    60-78540 U    5/1985
JP    7-78046 A    3/1995
JP    2000-123669 A    4/2000
(Continued)

OTHER PUBLICATIONS

Official Communication issued in International Patent Application No. PCT/JP2015/051548, dated Apr. 7 2015.

*Primary Examiner* — Adam R Giesy
(74) *Attorney, Agent, or Firm* — Keating & Bennett, LLP (57) ABSTRACT

An input device includes: a key (8); and an elastic supporting member (11) supporting the key (8) in such a manner as to allow the key (8) to move in a pressing direction of the key (8), the elastic supporting member (11) including: a post section (12) protruding below a level of a bottom face of the key (8) from an edge (8a) of the key (8); and an elastic arm section (13) connected to a tip end of the post section (12) and extending along the edge (8a) of the key (8).

5 Claims, 7 Drawing Sheets

(56) References Cited

FOREIGN PATENT DOCUMENTS

| JP | 4381204 | B2 | 12/2009 |
| JP | 4530921 | B2 | 8/2010 |
| JP | 2012-160365 | A | 8/2012 |

* cited by examiner

INPUT DEVICE AND ELECTRONIC APPARATUS INCLUDING SAME

TECHNICAL FIELD

The present invention relates to an input device for an electronic apparatus and also to an electronic apparatus including such an input device.

BACKGROUND ART

As an example of these kinds of input devices, Patent Document 1 describes a keyboard. In this keyboard of Patent Document 1, a plurality of keytops (alternatively, may be referred to as "keys") are linked via linking sections, keys are disposed on a top face of a rubbery elastic plate for support, and there are provided pressing sections at those respective sites on a bottom face of the rubbery elastic plate each of which matches the position of a different one of the keys.

In Patent Document 2, a plurality of keytops (alternatively, may be referred to as "keys") are linked via linking sections, and there is provided a pressing section on a bottom face of each key. When one of the keys is pressed, a switch is pressed by the pressing section provided on the bottom face of that key.

In Patent Document 3, a plurality of operation buttons (alternatively, may be referred to as "keys") are linked via linking sections, and a flexible board is interposed between the keys and a holding plate, so that the operation of the keys can be detected through domal switches provided on the flexible board.

In Patent Document 4, a plurality of keytops (alternatively, may be referred to as "keys") are linked via linking rails beforehand. The keys are then attached integrally to respective switches before the linking rails are broken off.

In Patent Document 5, each keytop (alternatively, may be referred to as a "key") is linked to the inner wall of an opening in a keytop-carrying plate via a linking arm, and there is provided a pressing section on a bottom face of the key. When the key is pressed, the linking arm bends, thereby allowing the key to move in such a manner that the pressing section on the bottom face of the key can press a switch.

CITATION LIST

Patent Documents

Patent Document 1: JP 4530921 B
Patent Document 2: JP 4381204 B
Patent Document 3: JP 2012-160365 A
Patent Document 4: JP 7-78046 A
Patent Document 5: JP 60-78540 U

SUMMARY OF THE INVENTION

Problems to be Solved by the Invention

In Patent Documents 1 to 3, however, the linking sections are interposed between the keys to link the keys together. It is hence difficult to narrow down key-to-key distances to arrange a large number of keys in a tight space. To put it differently, each key needs to be reduced in size to accommodate a large number of keys in a tight space.

Likewise, in Patent Document 4, the linking rails are interposed between the keys to link the keys together. It is hence difficult to narrow down key-to-key distances to arrange a large number of keys in a tight space; to this end, each key needs to be reduced in size.

In Patent Document 5, the keytop-carrying plate has formed therein a plurality of openings in which respective keys are provided. Therefore, it is again difficult to narrow down key-to-key distances to arrange a large number of keys in a tight space; to this end, each key needs to be reduced in size.

Meanwhile, recent years have seen trends that electronic apparatuses are progressively reduced in size and thickness. Patent Documents 1 to 3 and 5 can reduce the height of the keys and the height of a construction including the switches and other related components provided below the bottom faces of the keys. On the other hand, Patent Documents 1 to 3 and 5 fail to narrow down key-to-key distances as described earlier, which can inhibit size reduction of the electronic apparatus. In Patent Document 4, the height of the keys and the height of a construction including the switches and other related components provided below the bottom faces of the keys are too large, which can inhibit thickness reduction of the electronic apparatus.

The present invention provides an input device suitable for reducing the size and thickness of an electronic apparatus and also provides an electronic apparatus including such an input device.

Solution to Problem

An input device in accordance with the present invention includes: a key; and an elastic supporting member supporting the key in such a manner as to allow the key to move in a pressing direction of the key, the elastic supporting member including: a post section protruding below a level of a bottom face of the key from an edge of the key; and an elastic arm section connected to a tip end of the post section and extending along the edge of the key.

In this context, the input device may be, for example, a keyboard, but is by no means limited to this example.

In the input device in accordance with the present invention, the elastic arm section may include a fixing portion thereon at a distance from the post section in a direction of the edge of the key, the fixing portion fixing the elastic arm section.

Furthermore, in the input device in accordance with the present invention, the elastic arm section may include a bent portion thereon at a distance from the post section in a direction of the edge of the key.

The input device in accordance with the present invention may further include: a switch; and a protruding section on the bottom face of the key, the protruding section configured to press the switch in accordance with the key moving in the pressing direction, the protruding section having a height that is less than a height of the elastic arm section, both heights being measured from a top face of the key.

The input device in accordance with the present invention may further include a plurality of the keys including the respective post sections, wherein the elastic arm section is connected to tip ends of the post sections so that the post sections are linked via the elastic arm section.

An electronic apparatus including any one of the input devices described above is encompassed in the scope of the present invention.

Advantageous Effects of the Invention

In the input device configured as above, when any of the keys is pressed, the pressing force acting on that key is exerted on the elastic arm section via an associated one of the post sections, causing the elastic arm section to bend and deform in the pressing direction of the key. Meanwhile, when the key is released, the elastic arm section reverts to the original shape thereof, allowing the key to move back to the original position thereof.

The post sections of the elastic supporting member protrude below the level of the bottom faces of the keys from edges of the keys, and the elastic arm section of the elastic supporting member is connected to the tip ends of the post sections and extends along the edges of the keys. Therefore, the post sections and the elastic arm section of the elastic supporting member both hardly protrude beyond the edges of the keys. Hence, there is no need for a reserved space that accommodates the keys at least on these edges of the keys. This structure allows for size reduction of the input device, which in turn allows for size reduction of an electronic apparatus that contains the input device. Alternatively, the same structure allows for size increase of the keys.

MODE FOR CARRYING OUT THE INVENTION

The following will describe embodiments of the present invention in detail in reference to attached drawings.

Figure 1:
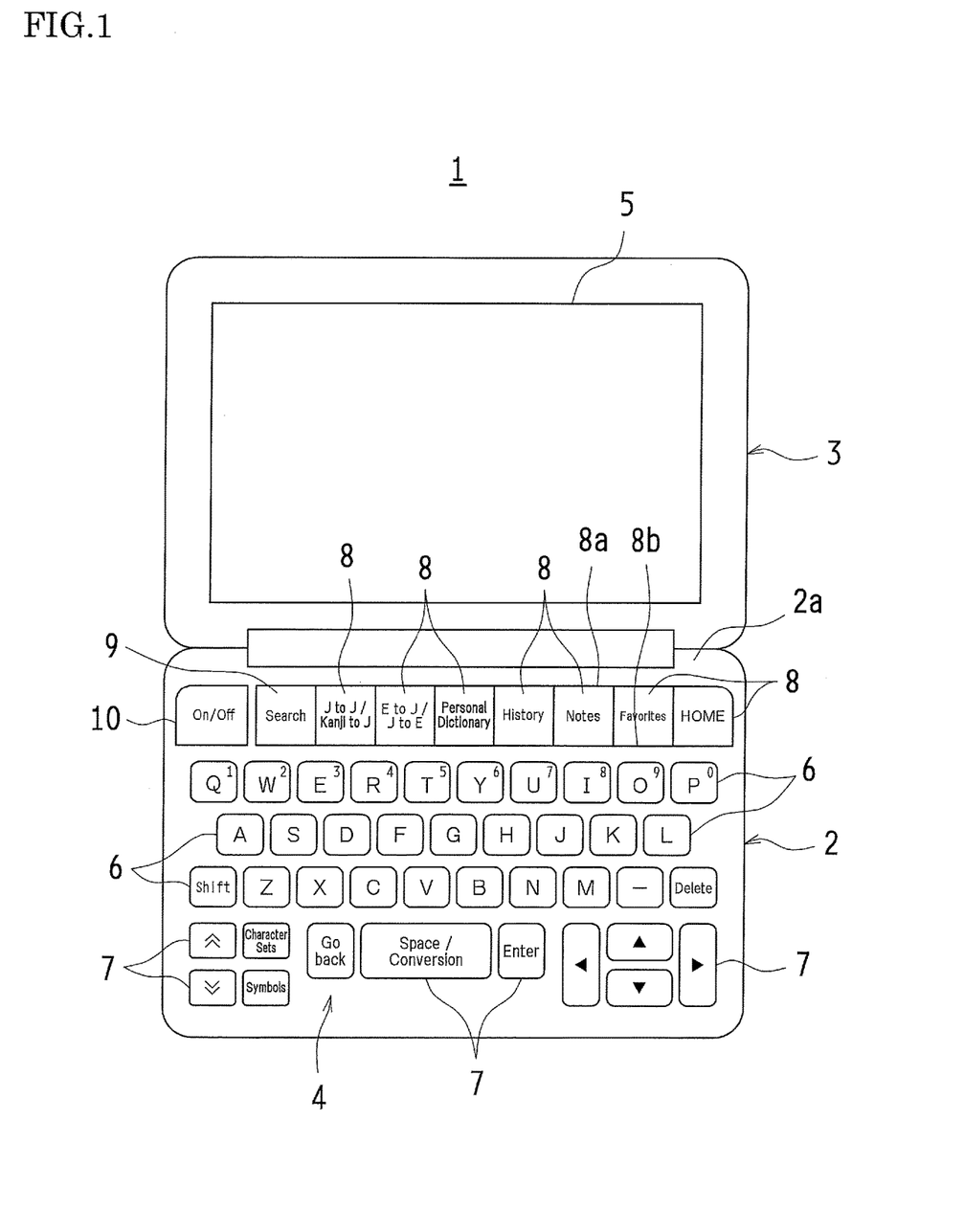
FIG. 1 is a perspective view of an electronic apparatus including a keyboard that is an application of embodiments 1 to 3 of the present invention.
Figure 2:
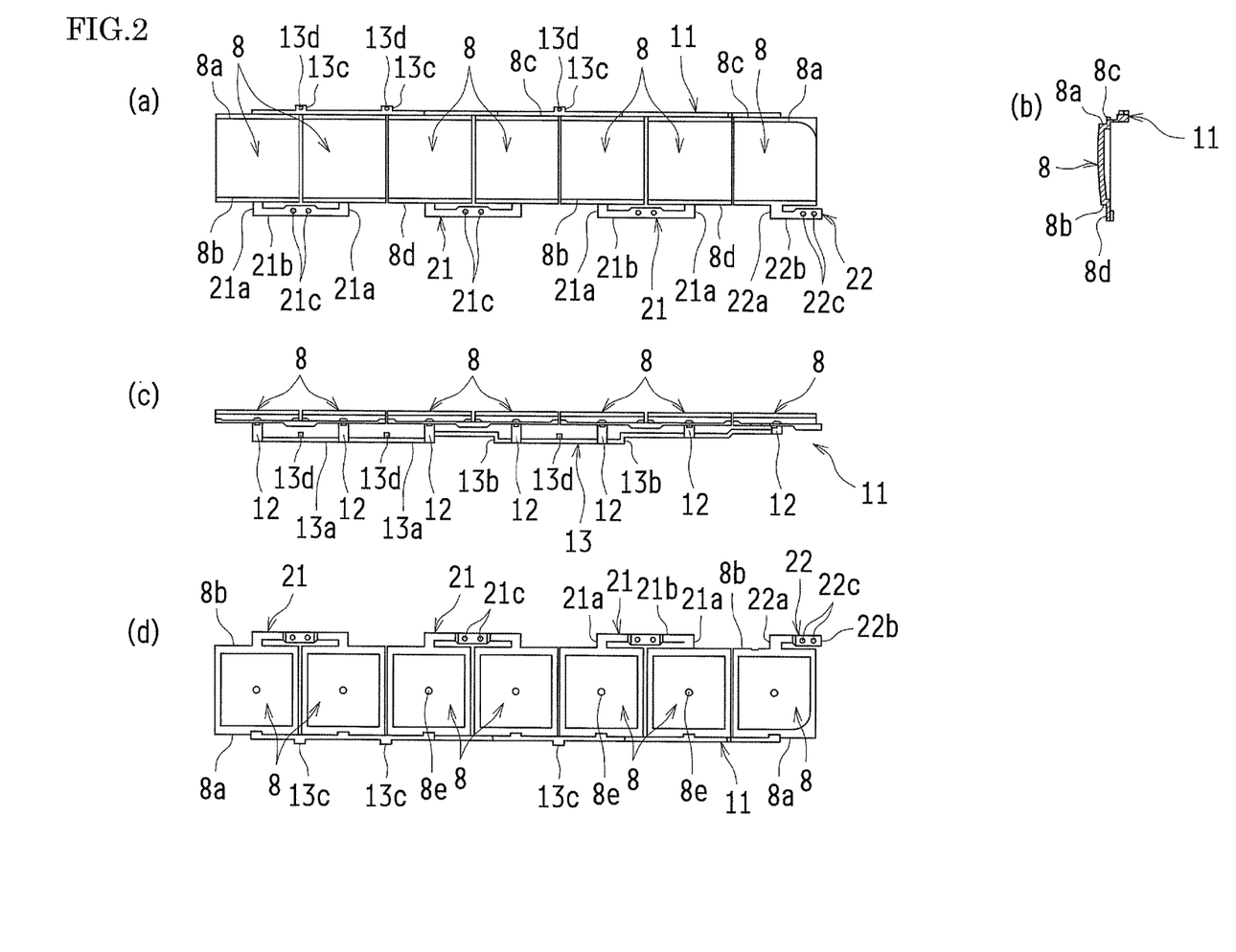
FIGS. 2(a), 2(b), 2(c), and 2(d) are a top view, a side view, a front view, and a bottom view, respectively, of menu keys on the keyboard shown in FIG. 1.

FIG. 1 is a perspective view of an electronic apparatus including a keyboard that is an application of embodiments 1 to 3 of the present invention. As illustrated in FIG. 1, an electronic apparatus 1 includes a main body housing 2 and an open/close body 3. The open/close body 3 is linked to a frame section 2a of the main body housing 2 via a hinge in such a manner that the open/close body 3 can be freely opened/closed. There is provided a keyboard 4 on a top face of the main body housing 2. Inside the open/close body 3 is there provided a display section 5, such as a liquid crystal display device.

The keyboard 4 includes alphabetic keys 6 and operation keys 7 disposed at a distance from each other, menu keys 8 disposed close to each other, an additional menu key 9 disposed beside the menu keys 8, and a power key 10. The alphabetic keys 6 and operation keys 7, disposed at a distance from each other, may assume any one of numerous existing structures because the keys 6 and 7, as well as a construction including switches and other related components provided below bottom faces of the keys 6 and 7, do not need to be reduced much in size.

In contrast, the menu keys 8, disposed close to each other, have such a structure that there is no frame between the menu keys 8. In addition, the menu keys 8 are disposed so close to the frame section 2a of the main body housing 2 that the frame section 2a has a reduced width. Therefore, the menu keys 8 and a construction including switches and other related components provided below bottom faces of the menu keys 8 need to be practically confined inside a space reserved for the menu keys 8. In other words, the menu keys 8 need to be disposed closely together in a tight space.

Accordingly, embodiment 1 has an object to dispose the menu keys 8 close to the frame section 2a of the main body housing 2 and also close to each other by linking edges 8a of the menu keys 8 together.

Embodiment 2 has an object to improve the strength of a supporting structure for the menu keys 8.

Embodiment 3 has an object to dispose the menu keys 8 close to each other by further linking other edges 8b of the menu keys 8 together.

The additional menu key 9 and the power key 10 have substantially the same structure as the menu keys 8, and description thereof is omitted.

Figure 3:
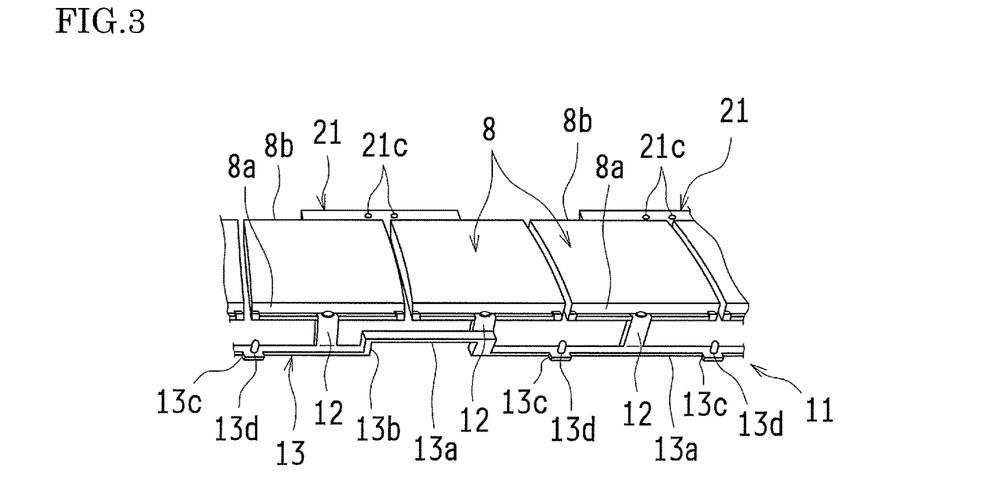
FIG. 3 is a frontal perspective view of some of the menu keys.
Figure 4:
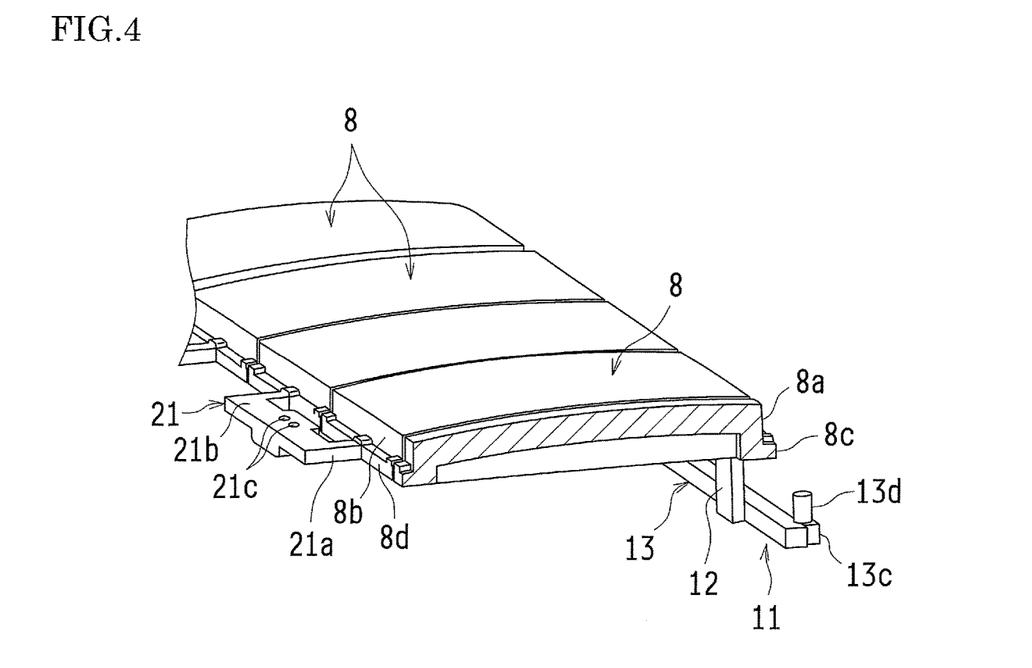
FIG. 4 is a rear perspective view of some of the menu keys.

Next will be described in detail the structure of the menu keys 8, which is an application of embodiments 1 to 3. FIGS. 2(a), 2(b), 2(c), and 2(d) are a top view, a side view, a front view, and a bottom view, respectively, of the menu keys 8. FIG. 3 is a frontal perspective view of some of the menu keys 8. FIG. 4 is a rear perspective view of some of the menu keys 8. The "front" of each menu key 8 faces the frame section 2a of the main body housing 2, whereas the "rear" of each menu key 8 faces the alphabetic keys 6.

Embodiment 1

Embodiment 1, as described earlier, has an object to dispose the menu keys 8 close to the frame section 2a of the main body housing 2 and also close to each other by linking the edges 8a of the menu keys 8 together.

As illustrated in FIGS. 2(a) to 2(d), 3, and 4, the menu keys 8 are substantially rectangular when viewed from above. Each menu key 8 has formed on the edge 8a thereof a flange 8c that protrudes slightly from the menu key 8 and also has formed on the edge 8b thereof a flange 8d that protrudes slightly from the menu key 8.

The flange 8c, formed on the edge 8a of each menu key 8, is supported by an elastic supporting member 11 in such a manner as to be capable of moving in a direction in which the menu key 8 can be pressed ("pressing direction of the menu key 8"). The edges 8a of the menu keys 8 are linked integrally via the elastic supporting member 11.

The elastic supporting member 11 includes a plurality of post sections 12 and an elastic arm section 13. Each post section 12 is provided so as to protrude below the level of the bottom face of an associated one of the menu keys 8 from the center of the flange 8c on the edge 8a of that menu key 8. The elastic arm section 13 is connected to the tip ends of the post sections 12 and extends along the edges 8a of the menu keys 8 (parallel to the row of the menu keys 8) to link the post sections 12 together. The menu keys 8 are hence linked via the post sections 12 and the single elastic arm section 13.

In this embodiment 1, the elastic supporting member 11 is provided that supports the edges 8a of the menu keys 8 in such a manner that the menu keys 8 can move in the pressing direction thereof. The elastic supporting member 11 is structured to hardly protrude beyond the edges 8a of the menu keys 8 toward the frame section 2a. This structure allows the menu keys 8 to be disposed close to the frame section 2a of the main body housing 2. In addition, the elastic supporting member 11 supports the menu keys 8 integrally without having to be interposed between the menu keys 8, thereby allowing the menu keys 8 to be disposed close to each other.

Embodiment 2

Embodiment 2, as described earlier, has an object to improve the strength of a supporting structure for the menu keys 8.

As illustrated in FIGS. 2(a) to 2(d), 3, and 4, the elastic arm section 13 includes a plurality of linear portions 13a and a plurality of L-shaped bent portions 13b.

Each linear portion 13a of the elastic arm section 13 has formed thereon a convex section 13c that protrudes slightly beyond an associated one of the menu keys 8. Each convex section 13c is provided thereon with a protrusion 13d. The convex sections 13c and the protrusions 13d are located between the menu keys 8.

In this embodiment 2, the elastic supporting member 11 is bent in places, forming the bent portions 13b. This structure can improve the strength of the elastic supporting member 11.

Embodiment 3

Embodiment 3, as described earlier, has an object to dispose the menu keys 8 close to each other by further linking the edges 8b of the menu keys 8 together.

A plurality of elastic linking members 21 are provided on the ends of the menu keys 8 where the flanges 8d are provided on the edges 8b. The flanges 8d provided on those edges 8b of adjacent ones of the menu keys 8 are linked and supported by the associated elastic linking member 21 in such a manner that the flanges 8d can move in the pressing direction of the adjacent menu keys 8.

Each elastic linking member 21 includes two supporting sections 21a and a linking bar 21b. The supporting sections 21a protrude out of the adjacent menu keys 8 from the centers of the flanges 8d on the edges 8b of those menu keys 8. The linking bar 21b is connected to the tip ends of the supporting sections 21a and extends along the edges 8b of the menu keys 8 (parallel to the row of the menu keys 8) so as to link the supporting sections 21a. The linking bar 21b has two holes 21c near the center thereof. Both holes 21c are located close to a gap that separates the adjacent menu keys 8.

No elastic linking member 21 is provided that links a distal one of the menu keys 8 to one of the menu keys 8 that is adjacent thereto. Instead, there is provided an auxiliary elastic member 22 on the flange 8d on the edge 8b of the distal menu key 8. The auxiliary elastic member 22 includes a supporting section 22a and a bar 22b. The supporting section 22a protrudes out of the distal menu key 8 from the center of the flange 8d on the edge 8b of the distal menu key 8. The bar 22b is connected to the tip end of the supporting section 22a and extends along the edge 8b of the distal menu key 8 (parallel to the row of the menu keys 8). The bar 22b has two holes 22c near an end of the bar 22b. The holes 22c are located close to the distal end of the distal menu key 8. Each menu key 8 also has a protrusion 8e at the center of the bottom face thereof.

In this embodiment 3, the elastic linking member 21 (see, for example, FIG. 2) is provided on the edges 8b of adjacent ones of the menu keys 8, linking the adjacent menu keys 8 together. The elastic linking member 21, as well as the elastic supporting member 11, supports the menu keys 8 integrally without having to be interposed between the menu keys 8, thereby allowing the menu keys 8 to be disposed close to each other.

Figure 5:
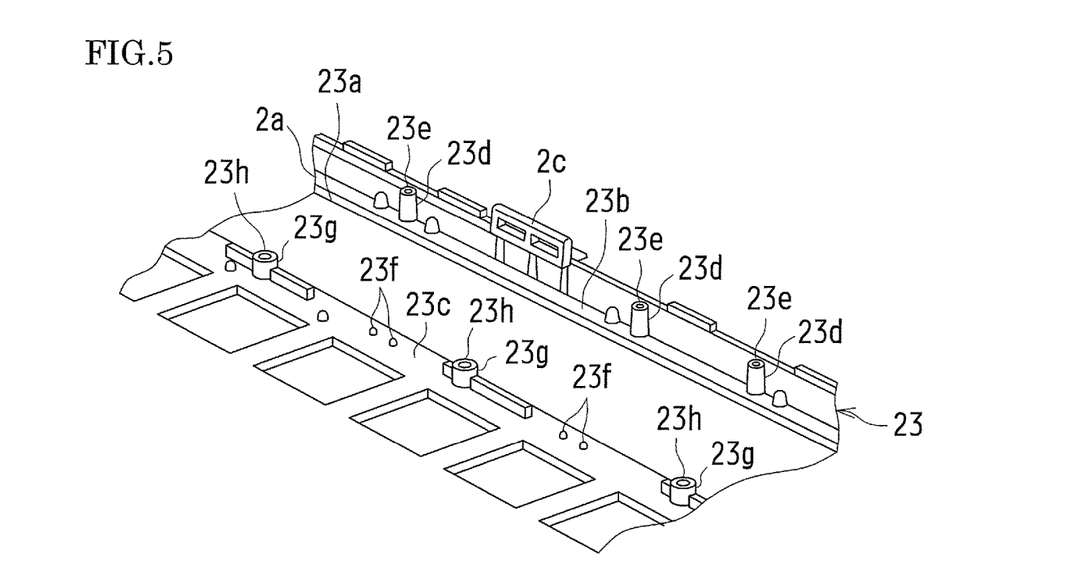
FIG. 5 is a perspective view of a part of a top lid of a main body housing to which the menu keys are attached, as viewed from a bottom side of the top lid.
Figure 6:
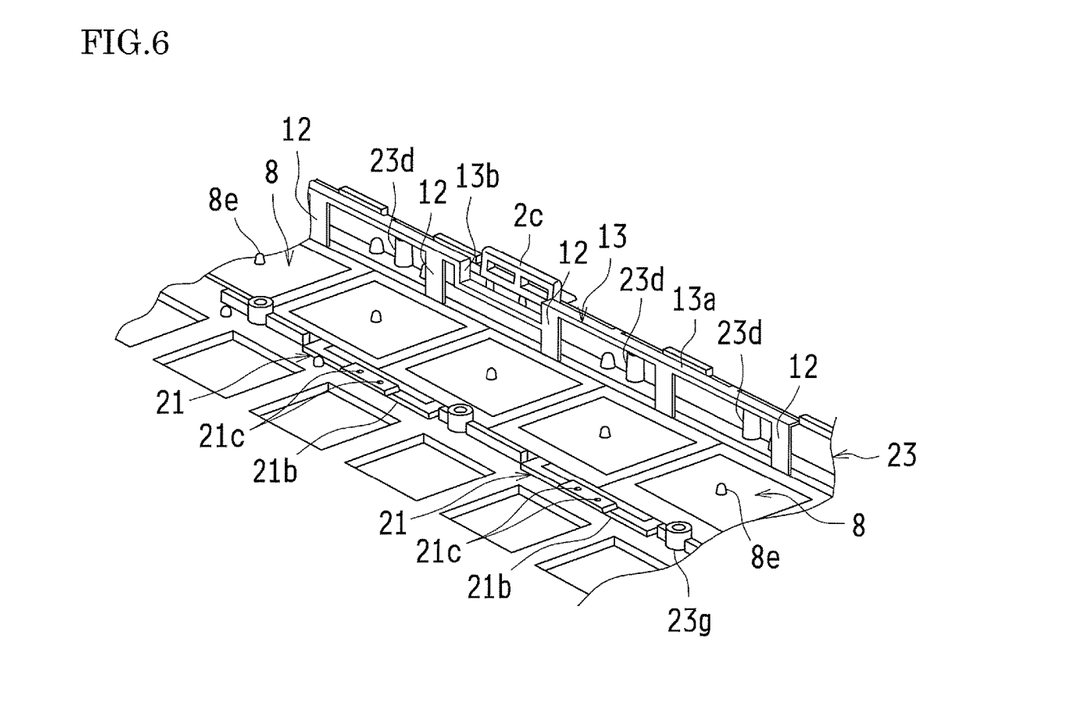
FIG. 6 is a perspective view of the menu keys attached to a part of the top lid of the main body housing, as viewed from the bottom side of the top lid.

Next will be described a supporting structure for the menu keys 8 in the main body housing 2 of the electronic apparatus 1. FIG. 5 is a perspective view of a part of a top lid 23 of the main body housing 2 to which the menu keys 8 are attached, as viewed from a bottom side of the top lid 23. FIG. 6 is a perspective view of the menu keys 8 attached to a part of the top lid 23 of the main body housing 2, as viewed from the bottom side of the top lid 23.

As illustrated in FIG. 5, the top lid 23 has an elongate rectangular opening 23a along the frame section 2a (see also FIG. 1) of the main body housing 2. Supporting faces 23b and 23c are formed on respective ends of the opening 23a. The supporting face 23b, or one of the supporting faces 23b and 23c located closer to the frame section 2a, makes a right angle with an inner wall surface 2b of the frame section 2a. The supporting face 23b is provided with a plurality of columnar sections 23d that come into contact with the inner wall surface 2b. Each columnar section 23d has a mating hole 23e. The inner wall surface 2b of the frame section 2a has formed in a predetermined position thereon a rectangular stopper 2c protruding on an opening 23 side.

The other supporting face 23c, or the one located farther from the frame section 2a, is provided thereon with plural pairs of protrusions 23f. The supporting face 23c is further provided thereon with a plurality of convex sections 23g. Each convex section 23g has a screw hole 23h.

The menu keys 8 are inserted into the opening 23a in the top lid 23 as illustrated in FIG. 6. When the menu keys 8 are in the opening 23a, the edges 8a of the menu keys 8 are located along an edge of the opening 23a, and the flanges 8c on the edges 8a of the menu keys 8 are positioned either facing or in contact with the supporting face 23b of the top lid 23. Likewise, the edges 8b of the menu keys 8 are located along another edge of the opening 23a, and the flanges 8d on the edges 8b of the menu keys 8 are positioned either facing or in contact with the supporting face 23c of the top lid 23.

Then, the convex sections 13c on the elastic arm section 13 for the menu keys 8 rest respectively on the columnar sections 23d on the supporting face 23b of the top lid 23, so that the protrusions 13d on the convex sections 13c of the elastic arm section 13 can fit into the mating holes 23e in the columnar sections 23d on the supporting face 23b. In addition, the rectangular stopper 2c on the inner wall surface 2b of the frame section 2a fits into the corners of the bent portions 13b of the elastic arm section 13.

The protrusions 23f on the supporting face 23c of the top lid 23 fit into the holes 21c in the elastic linking members 21 for the menu keys 8 and, although not illustrated in FIGS. 5 and 6, also fit into the holes 22c in the auxiliary elastic member 22 (illustrated in FIGS. 2(a), 2(c), and 2(d)) for the distal menu key 8.

As described above, the menu keys 8 are inserted into the opening 23*a* in the top lid 23. On the edge 8*a* end (as opposed to the edge 8*b* end) of the menu keys 8, (i) the flanges 8*c* on the edges 8*a* of the menu keys 8 are positioned either facing or in contact with the supporting face 23*b* of the top lid 23, (ii) the protrusions 13*d* on the elastic arm section 13 for the menu keys 8 fit into the mating holes 23*e* in the columnar sections 23*d* on the supporting face 23*b*, and (iii) the rectangular stopper 2*c* on the inner wall surface 2*b* of the frame section 2*a* fits into the bent portions 13*b* of the elastic arm section 13. On the edge 8*b* ends of the menu keys 8, (i) the edges 8*b* of the menu keys 8 are positioned either facing or in contact with the supporting face 23*c* of the top lid 23, and (ii) the protrusions 23*f* on the supporting face 23*c* fit into the holes 21*c* in the elastic linking members 21 for the menu keys 8 and also into the holes 22*c* in the auxiliary elastic member 22 for the distal menu key 8. The combination of all these motions positions the menu keys 8 relative to the opening 23*a* in the top lid 23 and fits the menu keys 8 into the opening 23*a*.

Figure 7:
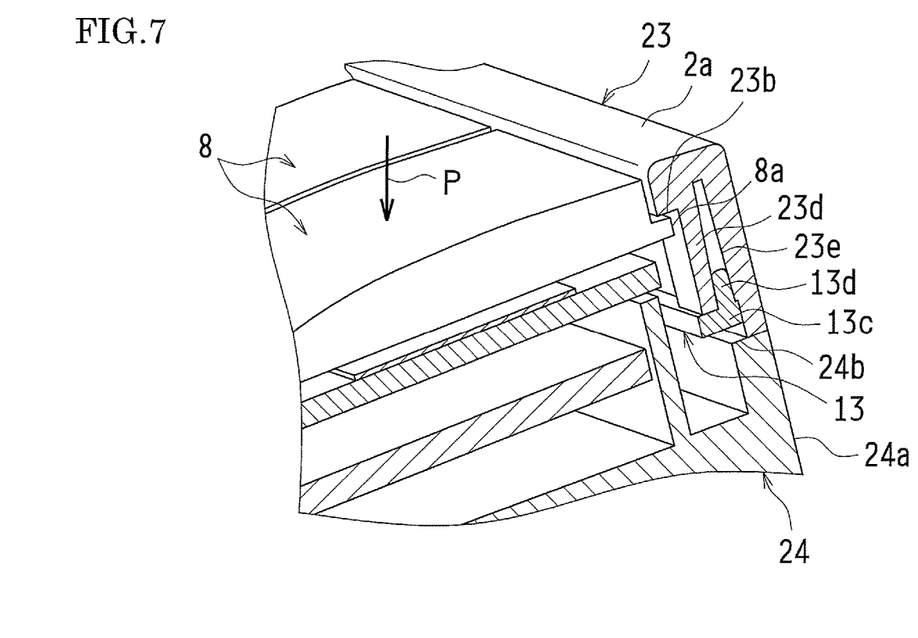
FIG. 7 is a partial perspective view of some of the menu keys being fixed by attaching a bottom body to the top lid of the main body housing.

FIG. 7 is a partial perspective view of some of the menu keys 8 being fixed by attaching a bottom body 24 to the top lid 23 of the main body housing 2. Referring to FIG. 7, on the edge 8*a* ends of the menu keys 8, (i) the protrusions 13*d* on the elastic arm section 13 for the menu keys 8 fit into the mating holes 23*e* in the columnar sections 23*d* on the supporting face 23*b*, and (ii) the bottom body 24 has a wall section 24*a* with a top face 24*b* being placed facing and close to the convex sections 13*c* on the elastic arm section 13.

In this state, if any of the menu keys 8 is pressed in the pressing direction P, a force is exerted in the pressing direction P on the associated post section 12 and the elastic arm section 13 of the elastic supporting member 11. The top face 24*b* of the wall section 24*a* of the bottom body 24 is nevertheless placed facing and close to the convex sections 13*c* on the elastic arm section 13. Therefore, the protrusions 13*d* on the elastic arm section 13 remain supported by, and do not come off, the mating holes 23*e* on the supporting face 23*b* in the pressing direction P.

The rectangular stopper 2*c* on the inner wall surface 2*b* of the frame section 2*a* is positioned on the same side as the bottom body 24 with respect to the elastic arm section 13 (not shown in FIG. 7). Hence, if any of the menu keys 8 is pressed in the pressing direction P, the bent portions 13*b* of the elastic arm section 13 remain supported without coming off in the pressing direction P, because the rectangular stopper 2*c* is in contact with the bent portions 13*b* of the elastic arm section 13.

On the edge 8*b* ends of the menu keys 8, although not shown in FIG. 7, those portions of the elastic linking members 21 for the menu keys 8 which are near the holes 21*c* and also those portions of the auxiliary elastic member 22 for the distal menu key 8 which are near the holes 22*c* are interposed between the supporting face 23*c* of the top lid 23 and a member (not shown) on the bottom body 24. Therefore, even if any of the menu keys 8 is pressed in the pressing direction P, the elastic linking members 21 and the auxiliary elastic member 22 remain supported without coming off in the pressing direction P.

As described above, even if any of the menu keys 8 is pressed in the pressing direction P, on the edge 8*a* ends of the menu keys 8, (i) the protrusions 13*d* on the elastic arm section 13 remain supported by, and do not come off, the mating holes 23*e* in the columnar sections 23*d* on the supporting face 23*b* in the pressing direction P, and (ii) the bent portions 13*b* of the elastic arm section 13 remain supported without coming off in the pressing direction P. On the edge 8*b* ends of the menu keys 8, those portions of the elastic linking members 21 which are near the holes 21*c* and those portions of the auxiliary elastic member 22 which are near the holes 22*c* remain supported without coming off in the pressing direction P.

Figure 8:
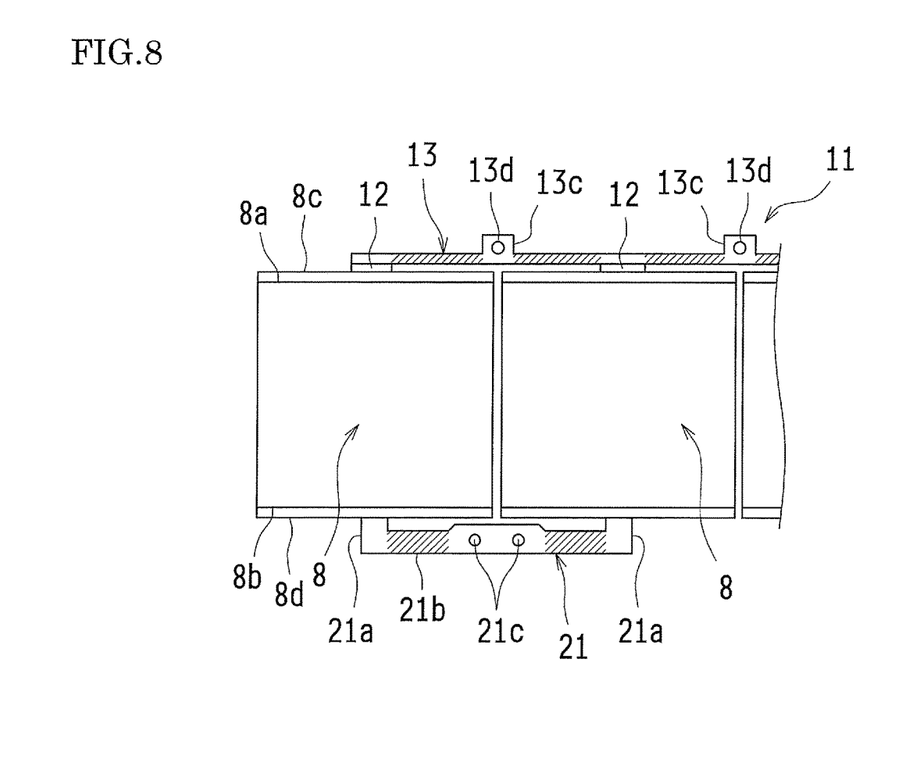
FIG. 8 is an enlarged top view of some of the menu keys.
Figure 9:
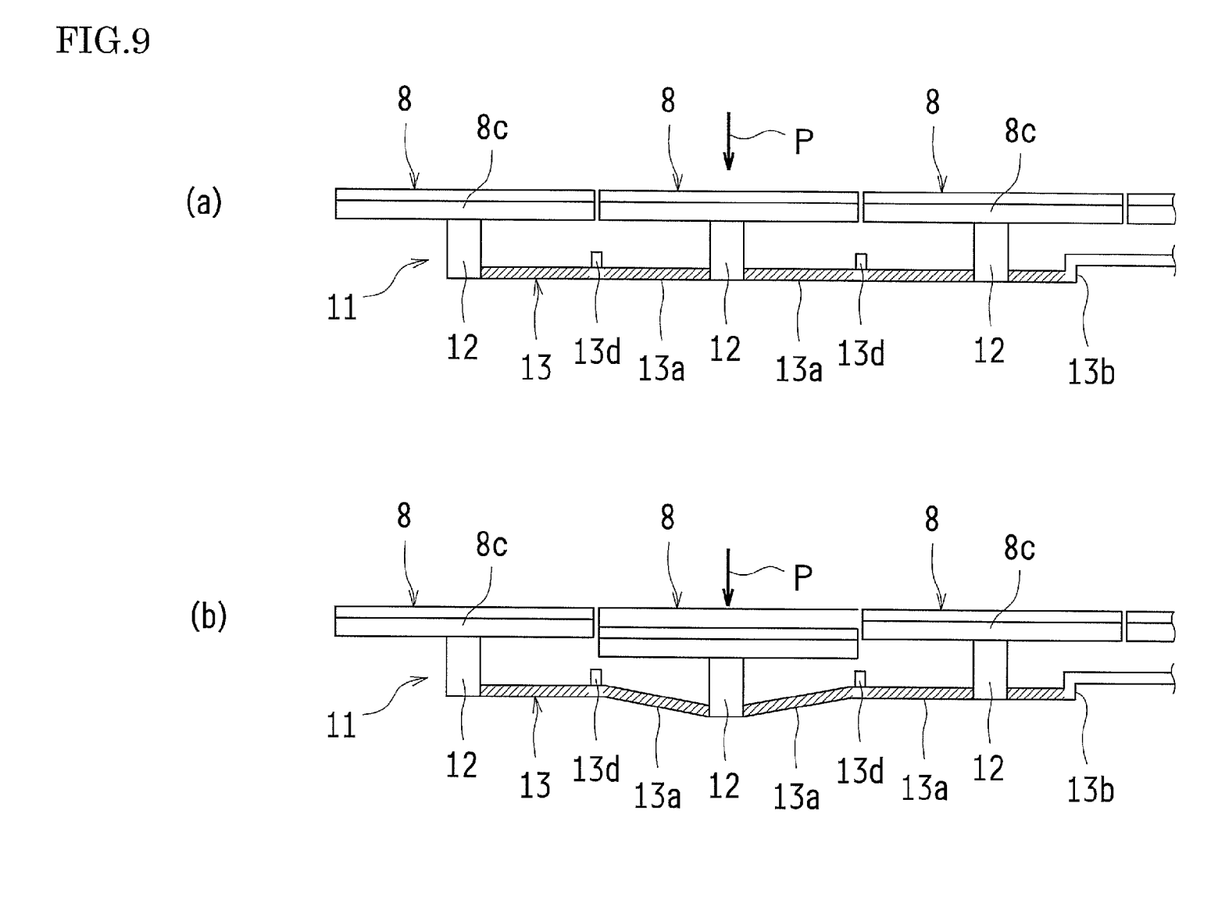
FIG. 9(a) is an enlarged front view of some of the menu keys.
FIG. 9(b) is a front view of those menu keys with one of the menu keys being pressed.

Next will be described elastic deformation of the elastic arm section 13, the elastic linking members 21, and the auxiliary elastic member 22 when any of the menu keys 8 is pressed in the pressing direction P. FIG. 8 is an enlarged top view of adjacent ones of the menu keys 8. FIGS. 9(*a*) and 9(*b*) are enlarged front views of some of those menu keys 8.

As described earlier, even if any of the menu keys 8 is pressed in the pressing direction P, on the edge 8*a* ends of the menu keys 8, (i) the protrusions 13*d* on the elastic arm section 13 remain supported by, and do not come off, the mating holes 23*e* on the supporting face 23*b* in the pressing direction P, (ii) the bent portions 13*b* of the elastic arm section 13 remain supported without coming off in the pressing direction P, and (iii) the protrusions 13*d* and the bent portions 13*b* (supporting positions) on the elastic arm section 13 are separated by a distance from the post sections 12 of the elastic supporting member 11 (centers of the flanges 8*c* of the menu keys 8). Therefore, if any of the menu keys 8 is pressed in the pressing direction P so that the associated post section 12 of the elastic supporting member 11 is displaced in the pressing direction P, as illustrated in FIGS. 8, 9(*a*), and 9(*b*), the elastic arm section 13 elastically deforms on both sides of that post section 12 (those linear portions 13*a* indicated by diagonal lines), hence allowing the edge 8*a* of the menu key 8 to move in the pressing direction P.

On the edge 8*b* ends of the menu keys 8, (i) those portions of the elastic linking members 21 which are near the holes 21*c* remain supported without being displaced in the pressing direction P, and (ii) these portions (supporting positions) are separated by a distance from the supporting sections 21*a* of the elastic linking members 21 (centers of the flanges 8*d* of the menu keys 8). Therefore, if any of the menu keys 8 is pressed in the pressing direction P, the linking bar 21*b* elastically deforms in places indicated by diagonal lines in FIG. 8, hence allowing the edge 8*b* of the menu key 8 to move in the pressing direction P.

Likewise, on the edge 8*b* ends of the menu keys 8, (i) those portions of the auxiliary elastic member 22 which are near the holes 22*c* remain supported without being displaced in the pressing direction P, and (ii) these portions (supporting positions) are separated by a distance from the supporting section 22*a* of the auxiliary elastic member 22 (center of the flange 8*d* of the menu key 8). Therefore, if the menu key 8 is pressed in the pressing direction P, the bar 22*b* of the auxiliary elastic member 22 elastically deforms, hence allowing the edge 8*b* of the menu key 8 to move in the pressing direction P.

As described above, if any of the menu keys 8 is pressed, the associated post section 12 of the elastic supporting member 11 is displaced in the pressing direction P, and the associated linear portions 13*a* of the elastic arm section 13 elastically deform, allowing the edge 8*a* of the menu key 8 to move in the pressing direction P. Meanwhile, the associated linking bars 21*b* of the elastic linking member 21 or the bar 22*b* of the auxiliary elastic member 22 elastically deform(s), allowing the edge 8*b* of the menu key 8 to move in the pressing direction P. Therefore, if any of the menu keys 8 is pressed, the elastic arm section 13 and either the elastic linking members 21 or the auxiliary elastic member 22 elastically deform(s), allowing the menu key 8 to move in the pressing direction P.

If the menu key 8 is released, the elastic arm section 13 and either the elastic linking members 21 or the auxiliary elastic member 22 revert to the original shapes thereof, hence allowing the menu key 8 to move back to the original position thereof in a direction opposite the pressing direction P.

The bent portions 13b, provided as parts of the elastic arm section 13, suitably reduce the amount by which the elastically deforming elastic arm section 13 is bent. This structure improves the strength of the elastic arm section 13 or the pressure resistance of the elastic arm section 13 against the pressing of the menu keys 8.

Figure 10:
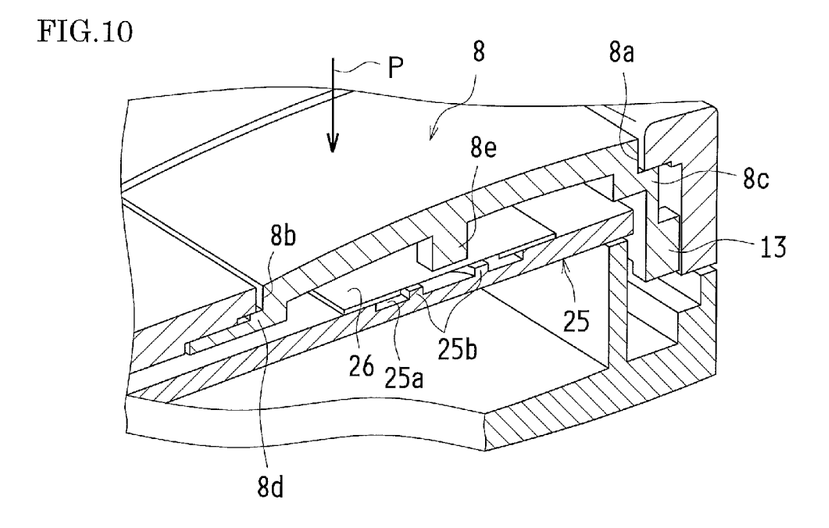
FIG. 10 is a perspective view of one of the menu keys and a switch disposed under that menu key.

FIG. 10 is a perspective view of one of the menu keys 8 and a switch disposed under that menu key 8. As illustrated in FIG. 10, a printed board 25 is disposed under the menu keys 8. Domal conductive plates 26 are placed on the printed board 25. The protrusions 8e are disposed respectively at the centers of the bottom faces of the menu keys 8 above the domal conductive plates 26. The printed board 25 has a concave section 25a under the central portion of each domal conductive plate 26. The concave section 25a has contact points 25b therein. The printed board 25 has a multilayer structure including a plurality of conducting layers. A first circuit pattern (not shown) on a top face of the printed board 25 is connected to peripheral sections of the domal conductive plates 26. The contact points 25b in the concave sections 25a are connected to a second circuit pattern (not shown) outside the concave sections 25a via a conducting layer provided either in the printed board 25 or on a bottom face of the printed board 25.

In this state, if any of the menu keys 8 is pressed to move in the pressing direction P, the protrusion 8e on the bottom face of that menu key 8 pushes down and deforms an associated one of the domal conductive plates 26. That domal conductive plate 26 then comes into contact with the contact points 25b so that the first circuit pattern and the second circuit pattern are connected via the domal conductive plate 26 and the contact points 25b. Meanwhile, if the menu key 8 is released to move back to the original position thereof in a direction opposite the pressing direction P, the domal conductive plate 26 moves away from the contact points 25b, disconnecting the first circuit pattern and the second circuit pattern. Hence, the first circuit pattern and the second circuit pattern can be connected and disconnected by pressing and releasing the menu key 8.

The domal conductive plate 26, elastically deforming and reverting to the original shape thereof in response to the pressing and releasing of the menu key 8, gives a clicking feel to the operation of the menu key 8.

As can be clearly understood from FIG. 10, the height of the protrusion 8e as measured from the top face of the menu key 8 is rendered less than the height of the elastic arm section 13 as measured from the top face of the menu key 8. In such a structure, the printed board 25 can be disposed internally with respect to the elastic arm section 13, which allows for thickness reduction of the electronic apparatus 1.

As described above, in the keyboard 4, to which embodiments 1 to 3 of the present invention are applied, the plural menu keys 8 are supported by the elastic supporting member 11, the elastic linking members 21, and the auxiliary elastic member 22 so that the plural menu keys 8 can move in the pressing direction P. The elastic supporting member 11 includes the plural post sections 12 and the elastic arm section 13. Each post section 12 is provided so as to protrude below the level of the bottom face of the associated menu key 8 from the center of the edge 8a of that menu key 8. The elastic arm section 13 is connected to the tip ends of the post sections 12 and extends along the edges 8a of the menu keys 8 to link the post sections 12 together. The post sections 12 and the elastic arm section 13 both hardly protrude beyond the edges 8a of the menu keys 8. Hence, there is no need for a reserved space that accommodates the menu keys 8 on the edge 8a ends of the menu keys 8. This structure allows for size reduction of the keyboard 4, which in turn allows for size reduction of the electronic apparatus 1. Alternatively, the same structure allows for size increase of the menu keys 8.

The post sections 12 for the menu keys 8 protrude below the level of the bottom faces of the menu keys 8. No printed boards or related components are, however, disposed near the frame section 2a of the main body housing 2 of the electronic apparatus 1. Therefore, the post sections 12 and the elastic arm section 13 connected to the tip ends of the post sections 12 for the menu keys 8 may be disposed inside the frame section 2a.

The bent portions 13b, provided as parts of the elastic arm section 13, suitably reduce the amount by which the elastically deforming elastic arm section 13 is bent. This structure improves the strength of the elastic arm section 13 or the pressure resistance of the elastic arm section 13 against the pressing of the menu key 8.

The menu keys 8 are integrally supported by the elastic supporting member 11 and also by the elastic linking members 21. No member is interposed between the menu keys 8. This structure enables the menu keys 8 to be disposed close to each other. That contributes to further size reduction of the keyboard 4, which in turn contributes to further size reduction of the electronic apparatus 1. Alternatively, the same structure contributes to further size increase of the menu keys 8.

The shape of the menu key 8 is designed so that the menu key 8 can be manufactured using simply structured dies from which the menu key 8 can be pulled out easily. As can be clearly understood from FIG. 2(b), the flange 8c, slightly protruding beyond the menu key 8, is provided on the edge 8a of the menu key 8. On the flange 8c is provided the elastic supporting member 11 that protrudes below the level of the bottom face of the menu key 8. Therefore, using a combined pair of a first die 31 and a second die 32 shown in FIG. 11(a) to form a space inside which the menu key 8 is molded, the menu key 8 can be readily pulled out of the molding space by splitting apart the first die 31 and the second die 32.

Figure 11:
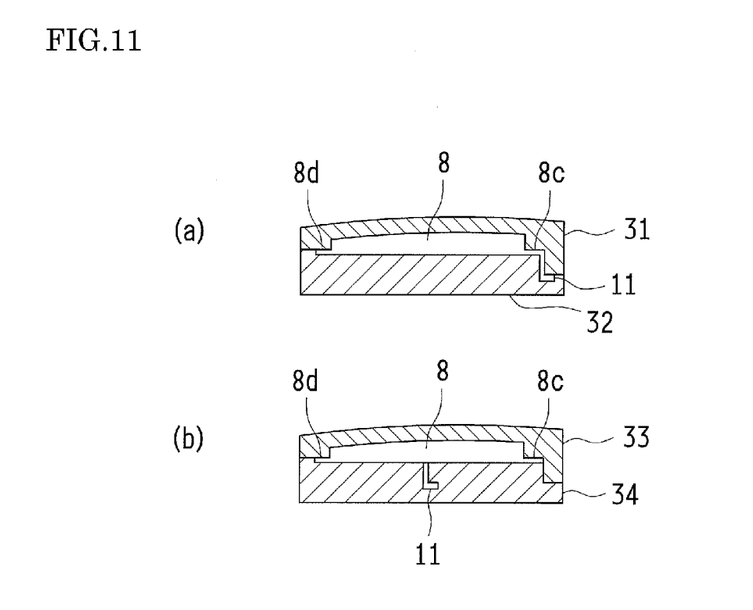
FIG. 11(a) is a schematic cross-sectional view of a pair of dies for the menu keys.
FIG. 11(b) is a schematic cross-sectional view of a pair of dies as a comparative example.

In contrast, if the elastic supporting member 11 is to be provided directly under the menu key 8 as illustrated in FIG. 11(b) using the combined pair of first and second dies 33 and 34 that forms a space inside which the menu key 8 is molded, the menu key 8 cannot be pulled out of the molding space in the second die 34 after the first die 33 and the second die 34 are split apart.

The preferred embodiments of the present invention have been so far described in reference to the attached drawings. The present invention is by no means limited to the embodiments and examples described above. The person skilled in the art could obviously conceive variations and modifications within the scope of the claims. The variations and modifications are encompassed in the technical scope of the claims.

As can be clearly understood from the description of embodiments 1 to 3, the keyboard in accordance with the present invention includes: a key; and an elastic supporting member supporting the key in such a manner as to allow the key to move in a pressing direction of the key, the elastic supporting member including: a post section protruding below a level of a bottom face of the key from an edge of the key; and an elastic arm section connected to a tip end of the post section and extending along the edge of the key.

According to this invention, when the key is pressed, the pressing force acting on the key is exerted on the elastic arm section via the post section, causing the elastic arm section to bend and deform in the pressing direction of the key. Meanwhile, when the key is released, the elastic arm section reverts to the original shape thereof, allowing the key to move back to the original position thereof.

The post section of the elastic supporting member protrudes below the level of the bottom face of the key from the edge of the key, and the elastic arm section of the elastic supporting member is connected to the tip end of the post section and extends along the edge of the key. Therefore, the post section and the elastic arm section of the elastic supporting member both hardly protrude beyond the edge of the key. Hence, there is no need for a reserved space that accommodates the key at least on one end of the key. This structure allows for size reduction of the keyboard, which in turn allows for size reduction of an electronic apparatus that contains the keyboard. Alternatively, the same structure allows for size increase of the key.

In the keyboard in accordance with the present invention, the elastic arm section may include a fixing portion thereon at a distance from the post section in a direction of the edge of the key, the fixing portion fixing the elastic arm section.

The fixing portion for the elastic arm, when fixed, enables suitable positioning of the key itself. In addition, since the fixing portion for the elastic arm is disposed at a distance from the post section in a direction of the edge of the key, the pressing force acting on the key, when exerted on the elastic arm section via the post section, readily bends and deforms the elastic arm section.

Furthermore, in the keyboard in accordance with the present invention, the elastic arm section may include a bent portion thereon at a distance from the post section in a direction of the edge of the key.

The bent portion of the elastic arm section suitably reduces the amount by which the elastic arm section is bent. This structure improves the strength of the elastic arm section or the pressure resistance of the elastic arm section against the pressing of the key.

The keyboard in accordance with the present invention may further include: a switch; and a protruding section on the bottom face of the key, the protruding section configured to press the switch in accordance with the key moving in the pressing direction, the protruding section having a height that is less than a height of the elastic arm section, both heights being measured from a top face of the key.

The keyboard in accordance with the present invention may further include a plurality of the keys including the respective post sections, wherein the elastic arm is connected to tip ends of the post sections so that the post sections are linked via the elastic arm.

This structure enables the plural keys to be supported integrally via the elastic arm, which in turn allows for reduction of key-to-key distances and size increase of the keys.

The keyboard in accordance with the present invention may further include an elastic linking member on other edges of the keys opposite those edges on which the post sections are provided, the elastic linking member linking adjacent ones of the keys together.

This structure enables the plural keys to be supported integrally further via the elastic linking member.

Additionally, in the keyboard in accordance with the present invention, the elastic linking member may protrude beyond the keys on the other edges of the keys.

The keyboard in accordance with the present invention may be disposed in a housing for an electronic apparatus. Among all the keys on the keyboard, the key(s) mentioned above may be located closest to an edge of the housing for the electronic apparatus.

No printed boards or related components are disposed near the edge of the housing for the electronic apparatus. The structure allows for provision of the post sections protruding below the level of the bottom faces of the keys and provision of the elastic arm section connected to the tip ends of the post sections.

The present application hereby claims priority on JP 2014-009700 A filed Jan. 22, 2014 in Japan, the entire contents of which are hereby incorporated herein by reference. The entire contents of the documents cited in the present specification are also hereby incorporated herein by reference.

REFERENCE SIGNS LIST

1 Electronic apparatus
2 Main body housing
3 Open/close body
4 Keyboard
5 Display section
6 Alphabetic key
7 Operation key
8 Menu key
9 Additional menu key
10 Power key
11 Elastic supporting member
12 Post section
13 Elastic arm section
13a Linear portion
13b Bent portion
21 Elastic linking member
22 Auxiliary elastic member
23 Top lid
24 Bottom body
25 Printed board
26 Domal conductive plate

The invention claimed is:

1. An input device, comprising:
   a plurality of keys; and
   an elastic supporting member supporting the plurality of keys in such a manner as to allow the plurality of keys to move in a pressing direction of the plurality of keys, the elastic supporting member including: a plurality of post sections protruding below a level of respective bottom faces of the plurality of keys from respective edges of the plurality of keys; and an elastic arm section connected to respective tip ends of the plurality of post sections and extending along the respective edges of the plurality of keys, wherein
   the plurality of keys are arranged in a direction along the respective edges of the plurality of keys, and the plurality of keys each include a corresponding one of the plurality of post sections, and
   the plurality of post sections are linked via the elastic arm section connected to the respective tip ends of the plurality of post sections.

2. The input device according to claim 1, wherein:
   the elastic arm section includes a fixing portion thereon at a distance from the plurality of post sections in a direction of the respective edges of the plurality of keys, and
   the fixing portion fixes the elastic arm section.

3. The input device according to claim 1, wherein the elastic arm section includes a bent portion thereon at a distance from the plurality of post sections in the direction along the respective edges of the plurality of keys.

4. The input device according to claim 1, the input device further comprising:
   a switch; and
   a protruding section on the respective bottom faces of the plurality of keys, wherein
   the protruding section is configured to press the switch in accordance with the plurality of keys moving in the pressing direction,
   the protruding section has a height that is less than a height of the elastic arm section, the height of the protruding section and the height of the elastic arm section being measured from a top face of the plurality of keys.

5. An electronic apparatus, comprising the input device according to claim 1.

* * * * *